(12) United States Patent
Nishitani et al.

(10) Patent No.: US 8,767,745 B2
(45) Date of Patent: Jul. 1, 2014

(54) COMMUNICATION DEVICE, COMMUNICATION SYSTEM, AND METHOD OF ALLOCATING BANDWIDTH

(75) Inventors: Takashi Nishitani, Tokyo (JP); Hiroaki Mukai, Tokyo (JP); Masaki Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 218 days.

(21) Appl. No.: 13/202,860

(22) PCT Filed: Feb. 23, 2009

(86) PCT No.: PCT/JP2009/053215
§ 371 (c)(1),
(2), (4) Date: Aug. 23, 2011

(87) PCT Pub. No.: WO2010/095269
PCT Pub. Date: Aug. 26, 2010

(65) Prior Publication Data
US 2011/0305451 A1 Dec. 15, 2011

(51) Int. Cl.
*H04L 12/28* (2006.01)
*H04L 12/56* (2006.01)

(52) U.S. Cl.
USPC .................. 370/395.41; 370/231; 370/232

(58) Field of Classification Search
USPC .......................................... 348/25
See application file for complete search history.

(56) References Cited

U.S. PATENT DOCUMENTS

| | | | |
|---|---|---|---|
| 6,570,883 B1* | 5/2003 | Wong | 370/412 |
| 2009/0010650 A1* | 1/2009 | Tsuchiya et al. | 398/59 |
| 2009/0110392 A1* | 4/2009 | Walid | 398/25 |
| 2010/0027561 A1* | 2/2010 | Greborio et al. | 370/468 |

FOREIGN PATENT DOCUMENTS

| | | |
|---|---|---|
| JP | 11 341037 | 12/1999 |
| JP | 2003 209572 | 7/2003 |
| JP | 2003-264587 | 9/2003 |

OTHER PUBLICATIONS

Mukai, H. et al., "Dynamic Bandwidth Assignment for the Next Generation PON", IEICE Technical Report CS2007-23(2007-10), vol. 107, No. 244, pp. 7-12, (Sep. 27, 2007).
International Search Report Issued Apr. 7, 2009 in PCT/JP09/053215 filed Feb. 23, 2009.
Decision of a Patent Grant issued Feb. 28, 2012 in Japanese Patent Application No. 2011-500437 with English Translation.
Supplementary European Search Report mailed on Nov. 8, 2013, in counterpart European Appln No. 09 84 0375.

* cited by examiner

*Primary Examiner* — Charles C Jiang
*Assistant Examiner* — M Mostazir Rahman
(74) *Attorney, Agent, or Firm* — Oblon, Spivak, McClelland, Maier & Neustadt, L.L.P.

(57) ABSTRACT

A communication device operating as a master unit includes: a MAC layer termination functioning unit for extracting, from a receiving signal, queue length information scheduled to be transmitted from an ONU, and controlling transmission of a grant to the ONU; a traffic monitor for measuring an amount of uplink traffic of each ONU; and a bandwidth allocation functioning unit for determining a bandwidth to be allocated to each ONU based on the queue length information extracted by the MAC layer termination functioning unit, the amount of traffic measured by the traffic monitor, and a bandwidth that can be allocated in one cycle of bandwidth update, and issuing a grant according to the determination. The bandwidth allocation functioning unit updates a bandwidth to be allocated periodically.

8 Claims, 6 Drawing Sheets

COMMUNICATION DEVICE, COMMUNICATION SYSTEM, AND METHOD OF ALLOCATING BANDWIDTH

TECHNICAL FIELD

The present invention relates to a method of allocating a bandwidth in a point-to-multipoint communication system.

BACKGROUND ART

In a point-to-multipoint communication system such as a PON (Passive Optical Network) system conventionally employed, an OLT (Optical Line Terminal) periodically updates an amount of bandwidth allocation which is information on a transmission grant that is to be given to an ONUs (Optical Network Unit). For efficient use of a bandwidth, the OLT determines an amount of bandwidth allocation according to the traffic condition of the ONUs. When transmitting variable-length data such as Ethernet frames (registered trademark) in the PON system, for example, the length of a grant designated by the OLT and a delimitation of data transmitted from the ONUs may not be at the same point. This generates a time period not used for uplink data transmission, resulting in a loss of a bandwidth. In this regard, in the conventional PON system, the ONU sends a report message to notify a queue length corresponding to the amount of data accumulated in an uplink buffer according to a delimitation in variable-length data. Then, the OLT allocates a grant corresponding to the queue length. In this manner, the OLT can fully use the allocated grant for data transmission, so that the OLT achieves bandwidth allocation without loss (see Patent Literature 1 and Non-Patent Literature 1 cited below).

Patent Literature 1: Japanese Patent Application Laid-open No. H11-146000

Non-Patent Literature 1: "Dynamic Bandwidth Allocation Algorithm for GE-PON" by YOSHIHARA et al., technical report NS2002-17 of the Institute of Electronics, Information and Communication Engineers

DISCLOSURE OF INVENTION

Problem to be Solved by the Invention

According to the aforementioned conventional technique, a queue length is notified in accordance with to the amount of uplink data accumulated in an uplink buffer. Accordingly, there has been a problem that the OLT can allocate a grant only after uplink data is accumulated in a buffer of the ONU, resulting in a delay in uplink data transmission. To be specific, not only a time required for propagation through an optical subscriber line, but also a time corresponding to one cycle of bandwidth update required for accumulation of data in an uplink buffer of the ONU should be considered.

Specifically, throughput relies on the round-trip time of data and the like especially if a user application employs a communication protocol such as TCP/IP according to which next data is transmitted after a response from an opposite terminal is received. Accordingly, a delay time should be reduced to obtain a high throughput.

In the conventional PON system, the limiting value of a transmission speed within a PON communication path is lower than the limiting value of throughput, so that a delay time does not present any problems. If the propagation time of an optical signal within a PON communication path of 20 km is 0.2 ms, for example, one cycle of bandwidth update is about 0.3 ms that is a shortest period determined in consideration of a time required for bandwidth calculation. In this case, the round-trip time is 0.5 ms that is the total of the propagation time and one cycle of bandwidth update. Accordingly, the highest throughput provided by the conventional technique is 1 Gbps, and it does not exceed the limit of the transmission speed in a PON communication path. As a result, a delay caused by accumulation of data in the ONU will not come to the surface if the transmission speed in a PON communication path does not exceed 1 Gbps.

However, a delay time becomes a bottleneck if the transmission speed in a PON communication path is increased. To be specific, TCP/IP throughput remains as 1 Gbps as long as the conventional bandwidth allocation system is employed even if the transmission speed in a PON communication path is increased to 10 Gbps, for example. Accordingly, there has been a problem that in order for four terminals to make concurrent transmission, for example, only a bandwidth of about 4 Gbps can be used even if more available bandwidth is left in a PON bandwidth, resulting in low efficiency of use of a bandwidth. Also, in this case, an end user cannot enjoy a benefit gained by upgrading.

The present invention has been made in view of the foregoing. It is an object of the invention to provide a method of allocating a bandwidth capable of increasing throughput by reducing a waiting time in uplink transmission by a terminal device.

Means for Solving Problem

In order to solve the aforementioned problems, a communication device operating as a master unit in a point-to-multipoint communication system in which the master unit and slave units transmit and receive variable length data to and from each other according to one aspect of the present invention is constructed in such a manner as to include: MAC layer termination functioning unit configured to control an extraction, from an incoming signal, of queue length information scheduled to be transmitted from the slave units, and a transmission of a grant to the slave units; traffic monitoring unit configured to measure an uplink traffic amount of each of the slave units; and bandwidth allocation functioning unit configured to determine a bandwidth to be allocated to the slave units based on the queue length information extracted by the MAC layer termination functioning unit, the traffic amount measured by the traffic monitoring unit, and a bandwidth that can be allocated in one cycle of bandwidth update, and issue a grant in accordance with the determination, wherein the bandwidth allocation functioning unit periodically updates a bandwidth to be allocated.

Effect of the Invention

The method of allocating a bandwidth according to the present invention can reduce a waiting time in uplink transmission by an ONU.

EXPLANATION OF LETTERS AND NUMERALS 1, 1B OLT
2 Splitter
3-1, 3-2, 3-3 ONU
11 Optical transmitter and receiver
12 MAC layer termination functioning unit
13, 13B Bandwidth allocation functioning unit
14 Traffic monitor
15 SNI
100, 101, 102, 103, 104, 105, 200, 201, 202, 300, 301, 302, 303, 304, 305, 400, 401, 402, 403, 404, 405, 500, 501, 502, 503, 504, 505, 506, 507, 600, 601, 602, 603, 700, 701, 702, 703, 800, 801, 802, 803 Bandwidth

BEST MODE(S) FOR CARRYING OUT THE INVENTION

Embodiments of a method of allocating a bandwidth according to the present invention will be described in detail below based on drawings. The embodiments are not intended to restrict the invention. In the description below, a case in which the method for allocating a bandwidth is applied in a PON system is described as an example.

First Embodiment

Figure 1:
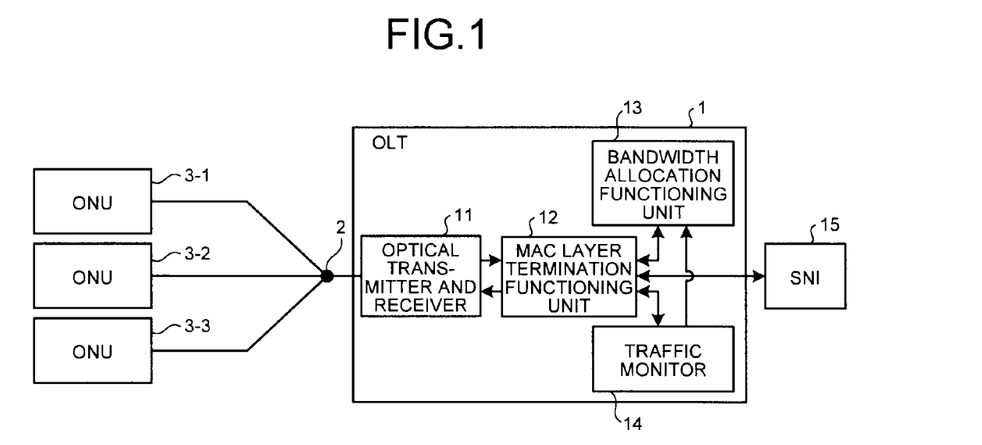
FIG. 1 shows an example of the configuration of a PON system in a first embodiment.

FIG. 1 shows an example of the configuration of a PON system in the present embodiment. The PON system shown in FIG. 1 includes an OLT 1 that is a station unit placed in a station housing of a telecommunications carrier, a splitter 2 that is an optical branching network including an optical fiber and a power splitter, and ONUs 3-1, 3-2 and 3-3 that are subscribers' units placed in subscribers' residences. The OLT 1 includes an optical transmitter and receiver 11, a MAC layer termination functioning unit 12, a bandwidth allocation functioning unit 13, and a traffic monitor 14.

The optical transmitter and receiver 11 converts a downlink signal to an optical signal, and transmits the optical signal to each of the ONUs. The optical transmitter and receiver 11 also converts an uplink optical signal received from each of the ONUs to an electrical signal. The MAC layer termination functioning unit 12 extracts queue length report information received from each of the ONUs, and outputs the extracted queue length report information to the bandwidth allocation functioning unit 13. Further, the MAC layer termination functioning unit 12 generates a grant on the basis of grant information notified from the bandwidth allocation functioning unit 13. The MAC layer termination functioning unit 12 multiplexes the grant with a downlink signal directed to each of the ONUs, and outputs the resultant signal to the optical transmitter and receiver 11. The bandwidth allocation functioning unit 13 manages grants to be allocated to the respective ONUs so that uplink signals from the ONUs will not collide with each other. The bandwidth allocation functioning unit 13 calculates a bandwidth to be allocated to each of the ONUs on the basis of the queue length report information notified from the MAC layer termination unit 12, and the traffic amount notified from the traffic monitor 14. Then, the bandwidth allocation functioning unit 13 determines grant information (containing a bandwidth to be allocated and an allocation starting time) regarding each of the ONUs on the basis of the result of the calculation, and notifies the MAC layer termination functioning unit 12 of the grant information. The traffic monitor 14 monitors the amount of actual data received from each of the ONUs, and notifies the bandwidth allocation functioning unit 13 of the monitored amount. An SNI (service network interface) 15 is an interface through which connection is made to a service network (not shown).

Figure 2:
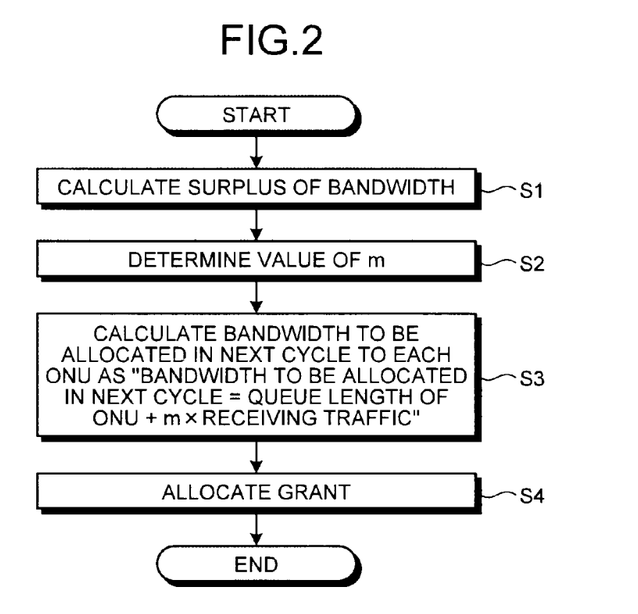
FIG. 2 is a flow chart for explaining a method of calculating a bandwidth to be allocated employed in the first embodiment.

The operation of bandwidth allocation of the PON system having the aforementioned configuration will be described next. FIG. 2 is a flow chart for explaining a method of calculating a bandwidth to be allocated employed in the first embodiment.

In order to update the amount of grant allocation periodically, the bandwidth allocation functioning unit 13 performs the operation shown in FIG. 2 in each cycle to determine a bandwidth to be allocated in a next cycle. The bandwidth allocation functioning unit 13 acquires the amount of data actually transmitted from each of the ONUs in a previous cycle on the basis of the amount of actual data notified from the traffic monitor 14. Then, the bandwidth allocation functioning unit 13 refers to queue length report information notified from the MAC layer termination unit 12 and the acquired traffic amount, and calculates a surplus bandwidth on the basis of them (step S1). More specifically, the bandwidth allocation functioning unit 13 determines an amount obtained by reflecting a queue length and the amount of traffic as a necessary bandwidth for each ONU and subtracts the necessary bandwidth from a bandwidth that can be allocated in one cycle of bandwidth update. A surplus bandwidth may be calculated in various ways according to how the queue length and the amount of traffic are reflected. Some examples of the calculation are given below, although they may be replaced by a different method.

First Method of Calculation

A surplus bandwidth is acquired by subtracting the queue length and the traffic amount of an ONU from a bandwidth that can be allocated in one cycle of bandwidth update. The queue length of an ONU corresponds to the amount of data already accumulated in a buffer of the ONU, and determined to be transmitted. The traffic amount corresponds to the amount of data actually received in a previous cycle, namely a previously executed performance, and indicates a tendency of the amount of transmission data. In this case, a necessary bandwidth defined by an amount of data to be transmitted and the previous performance is subtracted, and the remainder is regarded as being a surplus bandwidth.

Second Method of Calculation

A surplus bandwidth is acquired by subtracting the queue length of an ONU from a bandwidth that can be allocated in one cycle of bandwidth update. In this case, a necessary bandwidth that is defined by an amount of data determined to be transmitted is subtracted, and the remainder is defined as a surplus of bandwidth.

Third Method of Calculation

A surplus of bandwidth is acquired by subtracting a receiving traffic from an ONU from a bandwidth that can be allocated in one cycle of bandwidth update. In this case, a necessary bandwidth that is defined by the previous performance is subtracted, and the remainder is defined as a surplus of bandwidth.

Fourth Method of Calculation

A surplus of bandwidth is acquired by subtracting the queue length of an ONU and receiving traffic that is multiplied by a value (coefficient) that is a normalized value of a surplus bandwidth in a previous cycle from a bandwidth that can be allocated in one cycle of bandwidth update. In this case, a necessary bandwidth is determined not only by the amount of data scheduled to be transmitted, but also by a value that is obtained by multiplying a value of previous performance by the aforementioned coefficient for reflecting a tendency of the amount of transmission data. The necessary bandwidth thereby determined is subtracted, and the remainder becomes a surplus of bandwidth.

After a surplus bandwidth is acquired in the aforementioned manners, the bandwidth allocation functioning unit 13 determines a coefficient by which the acquired surplus bandwidth is reflected in bandwidth allocation. This coefficient is supposed to be m, for example. The bandwidth allocation functioning unit 13 determines the coefficient m, for example, by means of the following method (step S2) on the basis of the surplus bandwidth acquired in step S1.

In one example, m is set to "1" if the surplus bandwidth is equal to or larger than a predetermined threshold, and is set to "0" if the surplus bandwidth is smaller than the predetermined threshold. In another example, m is determined by comparing the surplus of bandwidth with a bandwidth that can be allocated in one cycle of bandwidth update and normalizing the surplus bandwidth. These examples may be applied in combination. The coefficient m may be determined by a different method.

After the coefficient m is determined in the foregoing manner, the bandwidth allocation functioning unit 13 calculates a bandwidth to be allocated in the next cycle for each ONU (step S3). More specifically, a bandwidth to be allocated in the next cycle is calculated, for example, as follows:

Bandwidth to be allocated in the next cycle=Queue length of an ONU+$m$×(Traffic amount of the ONU)

The bandwidth allocation functioning unit 13 makes this calculation for all ONUs, so as to acquire bandwidths to be allocated in the next cycle for each of the ONUs.

The bandwidth allocation functioning unit 13 determines grant information (step S4) on the basis of the thus obtained bandwidths thereby acquired to be allocated in the next cycle.

The coefficient m is determined by the aforementioned examples. Accordingly, if there is a large surplus of bandwidth, namely if the amount of uplink data transmitted from an ONU tends to be small, by adding a certain amount of bandwidth based on the traffic amount, data accumulated in an ONU buffer after transmission of a queue length report can also be transmitted. On the other hand, if a surplus bandwidth is small, namely if the amount of uplink data transmitted from an ONU tends to be large, only a bandwidth in an amount based on queue length information is allocated, and no predicted bandwidth allocation is included. By doing so, data already accumulated in an ONU buffer can be transmitted without fail. As described, a bandwidth is allocated in accordance with the amount of a surplus bandwidth, thereby realizing efficient bandwidth allocation.

The aforementioned calculation of the coefficient may be made for each cycle of bandwidth update, or for a given cycle. If the coefficient is calculated for a given cycle, a bandwidth to be allocated is determined on the basis of the latest coefficient.

A status of bandwidths in the PON system allocated by employing the foregoing method of bandwidth allocation will be described next. In the examples given below, m is set to zero and the traffic amount is not used for allocation if a surplus of bandwidth is smaller than a predetermined threshold. On the other hand, m is made the aforementioned normalized value if a surplus bandwidth is equal to or larger than the predetermined threshold.

Figure 3:
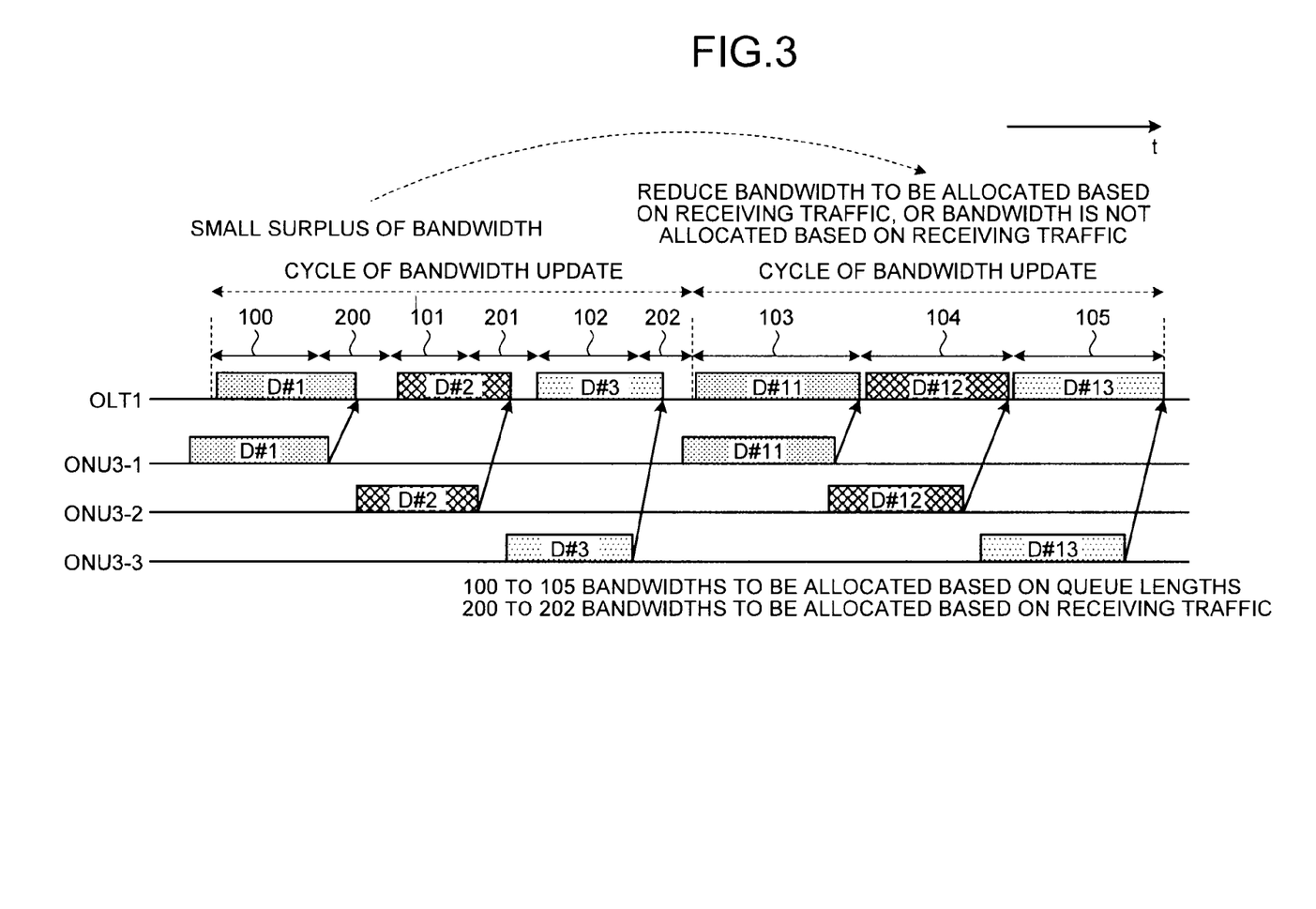
FIG. 3 is a timing chart showing bandwidths allocated before and after update of bandwidth allocation when a surplus bandwidth is small.

FIG. 3 is a timing chart showing bandwidths allocated before and after the update of bandwidth allocation when a surplus bandwidth is small. The ONUs 3-1, 3-2 and 3-3 in the PON system shown in FIG. 1 transmit data #1 (hereinafter called D#1), D#2 and D#3 respectively to the OLT 1 before the update of bandwidth allocation. At this time, bandwidths 100 and 200 are allocated to the ONU 3-1. Likewise, bandwidths 101 and 201 are allocated to the ONU 3-2, and bandwidths 102 and 202 are allocated to the ONU 3-3. The bandwidths allocated to the respective ONUs include the bandwidths 100 to 102 based on queue lengths, and the bandwidths 200 to 202 based on receiving traffic.

For bandwidth update, the OLT 1 determines bandwidths to be allocated in a new cycle of bandwidth update in the manner described above. Here, it is shown a case where the OLT 1 determines that a surplus of bandwidth is small. In this case, the OLT 1 allocates a bandwidth based only on a queue length, and does not allocate a bandwidth based on the amount of traffic. As a result, after the update of bandwidth allocation, the ONUs 3-1, 3-2 and 3-3 transmit data D#11, D#12 and D#13 in bandwidths 103, 104 and 105, respectively. The allocated bandwidths 103 to 105 are bandwidths based on queue lengths.

Figure 4:
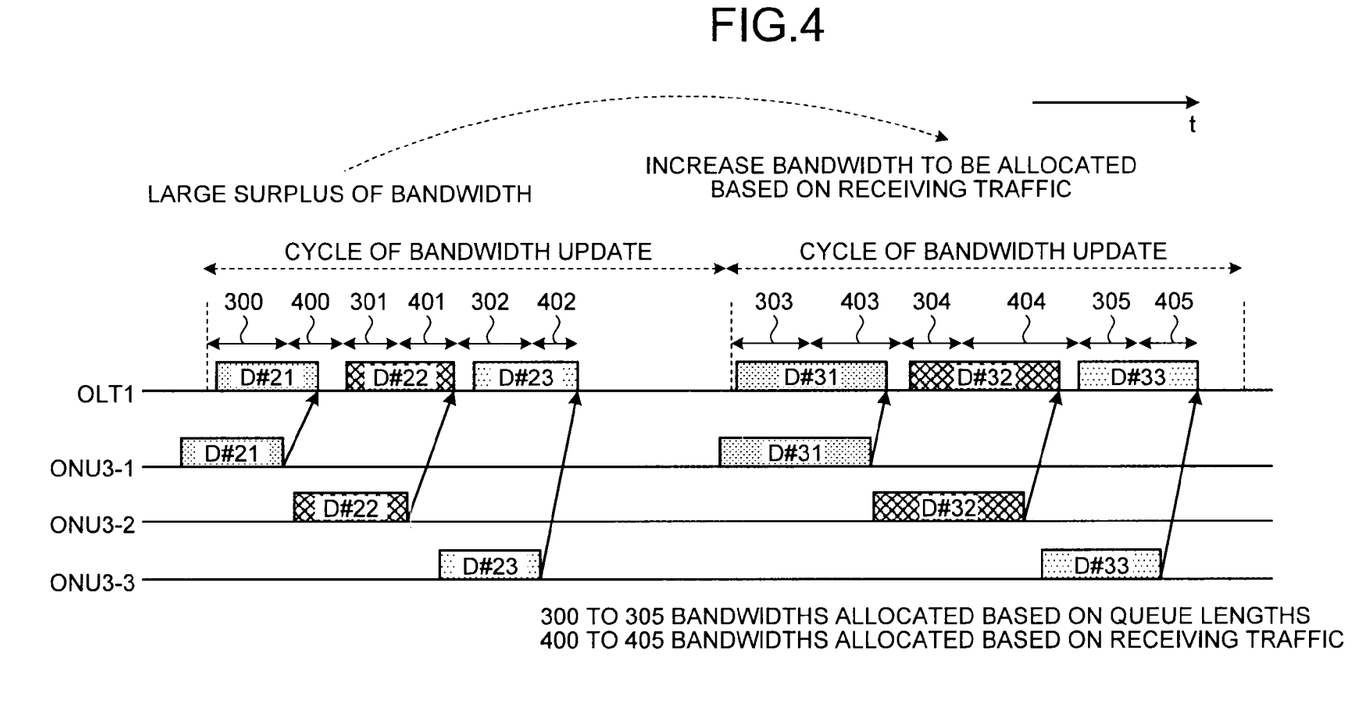
FIG. 4 is a timing chart showing bandwidths allocated before and after update of bandwidth allocation when a surplus of bandwidth is large.

FIG. 4 is a timing chart showing bandwidths allocated before and after update of bandwidth allocation when a surplus bandwidth is large. The ONUs 3-1, 3-2 and 3-3 in the PON system shown in FIG. 1 transmit data #21 (hereafter called D#21), D#22 and D#23 respectively to the OLT 1 before the update of bandwidth allocation. At this time, bandwidths 300 and 400 are allocated to the ONU 3-1. Likewise, bandwidths 301 and 401 are allocated to the ONU 3-2, and bandwidths 302 and 402 are allocated to the ONU 3-3. The bandwidths allocated to the ONUs include the bandwidths 300 to 302 based on queue lengths, and the bandwidths 400 to 402 based on receiving traffic.

Here, it is shown a case where the OLT 1 determines that a surplus bandwidth is large. In this case, in addition to a bandwidth based on a queue length as described above the OLT 1 additionally allocates a bandwidth based on the amount of traffic. As a result, after the update of bandwidth allocation, the ONU 3-1 transmits data D#31 using bandwidths 303 and 403, the ONU 3-2 transmits data D#32 using bandwidths 304 and 404, and the ONU 3-3 transmits data D#33 using bandwidths 305 and 405. The allocated bandwidths 303 to 305 are bandwidths based on queue lengths, and the allocated bandwidths 403 to 405 are bandwidths based on the amounts of traffic.

As described above, in the present embodiment, not only the amount of data scheduled for transmission that is based on a queue length report, but the amount of data expected to be transmitted that is based on the amount of traffic is also evaluated to determine a bandwidth to be allocated. Thus, data accumulated in an ONU buffer during an RTT (Round Trip Time) can also be transmitted when a bandwidth is granted. This realizes reduction of data accumulated in the ONU buffer, leading to a reduction in waiting time for uplink transmission by the ONU. Since a surplus bandwidth is calculated for each cycle of bandwidth update, a bandwidth to be allocated can be changed in accordance with the state of utilization of a bandwidth within a PON.

In the present embodiment, the amount of traffic is multiplied by a value (coefficient) proportionate to a surplus bandwidth. However, a queue length may also be multiplied by the same coefficient. In this case, a bandwidth to be allocated may be derived by the above same method. Alternatively, these methods may be employed in combination.

Further, in the present embodiment, the method of bandwidth allocation of the invention is applied to a PON system. The method of bandwidth allocation of the invention may also be applied to a different communication system other than a point-to-multipoint communication system. The OLT and the ONUs in the present embodiment operate as a master unit and slave units, respectively, and the similar structures and the operations thereof are also applicable to the different communication system.

Second Embodiment

In the first embodiment, for carrying out a dynamic bandwidth allocation, a surplus bandwidth is used as a parameter, and queue length information and the amount of traffic are reflected to a bandwidth to be allocated. In the present embodiment, a case in which the number of ONUs to make concurrent transmission is used as a parameter is explained.

Figure 5:
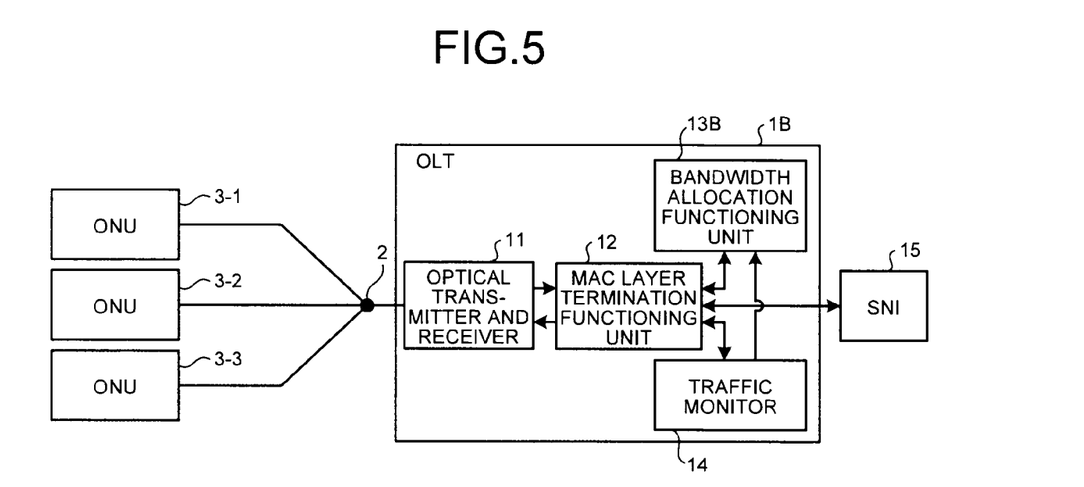
FIG. 5 shows an example of the configuration of a PON system in a second embodiment.

FIG. 5 shows an example of the configuration of a PON system in the second embodiment. As seen from the comparison with the PON system shown in FIG. 1, the PON system shown in FIG. 5 includes an OLT 1B instead of the OLT 1, and the OLT 1B includes a bandwidth allocation functioning unit 13B instead of the bandwidth allocation functioning unit 13 in the OLT 1. The bandwidth allocation functioning unit 13B has the same function as that of the bandwidth allocation functioning unit 13, but it calculates a bandwidth to be allocated in a method (described later) different from that employed by the bandwidth allocation functioning unit 13.

Figure 6:
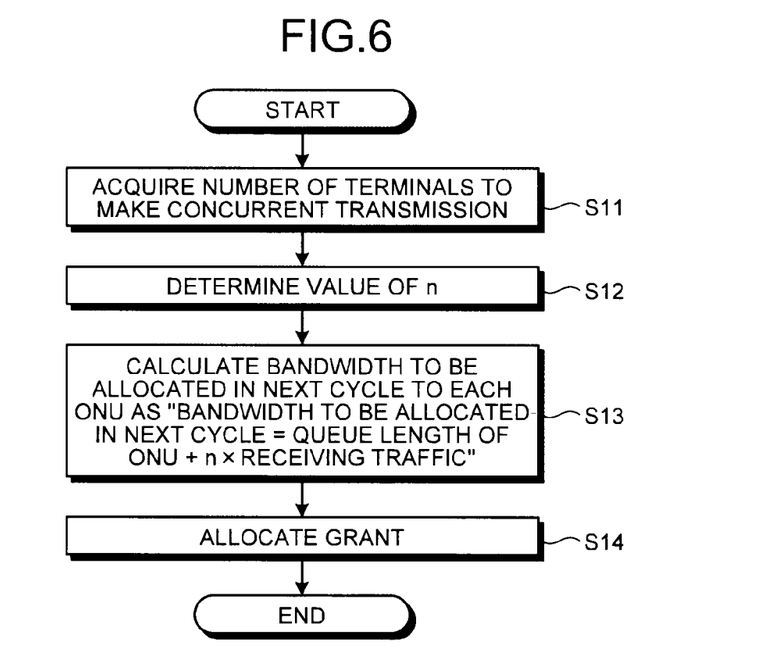
FIG. 6 is a flow chart for explaining a method of calculating a bandwidth to be allocated employed in the second embodiment.

The operation of bandwidth allocation in the PON system having the aforementioned configuration will be described next. FIG. 6 is a flow chart for explaining a method of calculating a bandwidth to be allocated employed in the present embodiment.

In order to update the amount of grant allocation periodically, the bandwidth allocation functioning unit 13B performs the operation shown in FIG. 6 in each cycle to determine a bandwidth to be allocated in the next cycle. The bandwidth allocation functioning unit 13B grasps the queue length information and the traffic amount of each ONU as described above. First, based on grant information managed by the bandwidth allocation functioning unit 13B itself or the like information, the bandwidth allocation functioning unit 13B acquires the number of ONUs (the number of terminals to make concurrent transmission) having requested data transmission in the next cycle (step S11). Next, the bandwidth allocation functioning unit 13B determines a coefficient by which the thus acquired number of terminals to make concurrent transmission is reflected in bandwidth allocation. This coefficient is supposed to be n, for example. The bandwidth allocation functioning unit 13B determines the coefficient n, for example, by means of the following method (step S12) on the basis of the number of ONUs acquired in step S11.

In one example, n is set to "0" if the number of terminals to make concurrent transmission is equal to or larger than a predetermined threshold, and is set to "1" if the number of terminals to make concurrent transmission is smaller than the predetermined threshold. In another example, the reciprocal of the number of terminals to make concurrent transmission is employed as n. These examples may be applied in combination. The coefficient n may be determined by means of a different method.

After the coefficient n is determined in the foregoing manner, the bandwidth allocation functioning unit 13B calculates a bandwidth to be allocated in the next cycle for each ONU (step S13). More specifically, a bandwidth to be allocated in the next cycle is calculated, for example, as follows:

Bandwidth to be allocated in the next cycle=Queue length of an ONU+n×(Traffic amount of the ONU)

The bandwidth allocation functioning unit 13B performs this calculation for all ONUs, so as to acquire bandwidths to be allocated in the next cycle for each of the ONUs.

The bandwidth allocation functioning unit 13B determines grant information (step S14) on the basis of the thus obtained bandwidths to be allocated in the next cycle.

The coefficient n is set as in the aforementioned example. Accordingly, if the number of terminals to make concurrent transmission is small, in other words, if more bandwidth to be used is available, by adding a certain amount of bandwidth based on the traffic amount, data accumulated in an ONU buffer after transmission of a queue length report can also be transmitted. On the other hand, if the number of terminals to make concurrent transmission is large, in other words, if there is little possibility of acquiring a bandwidth, only a bandwidth in an amount based on queue length information is allocated, and no predicted bandwidth allocation is included. By doing so, data already accumulated in an ONU buffer can be transmitted without fail. As described, a bandwidth is allocated in accordance with the number of terminals to make concurrent transmission, thereby realizing an efficient bandwidth allocation.

A status of bandwidths in the PON system allocated by employing the foregoing method of allocating a bandwidth will be described next. In one example given below, the coefficient n is determined on the basis of whether the number of terminals to make concurrent transmission is equal to or larger than a predetermined threshold.

Figure 7:
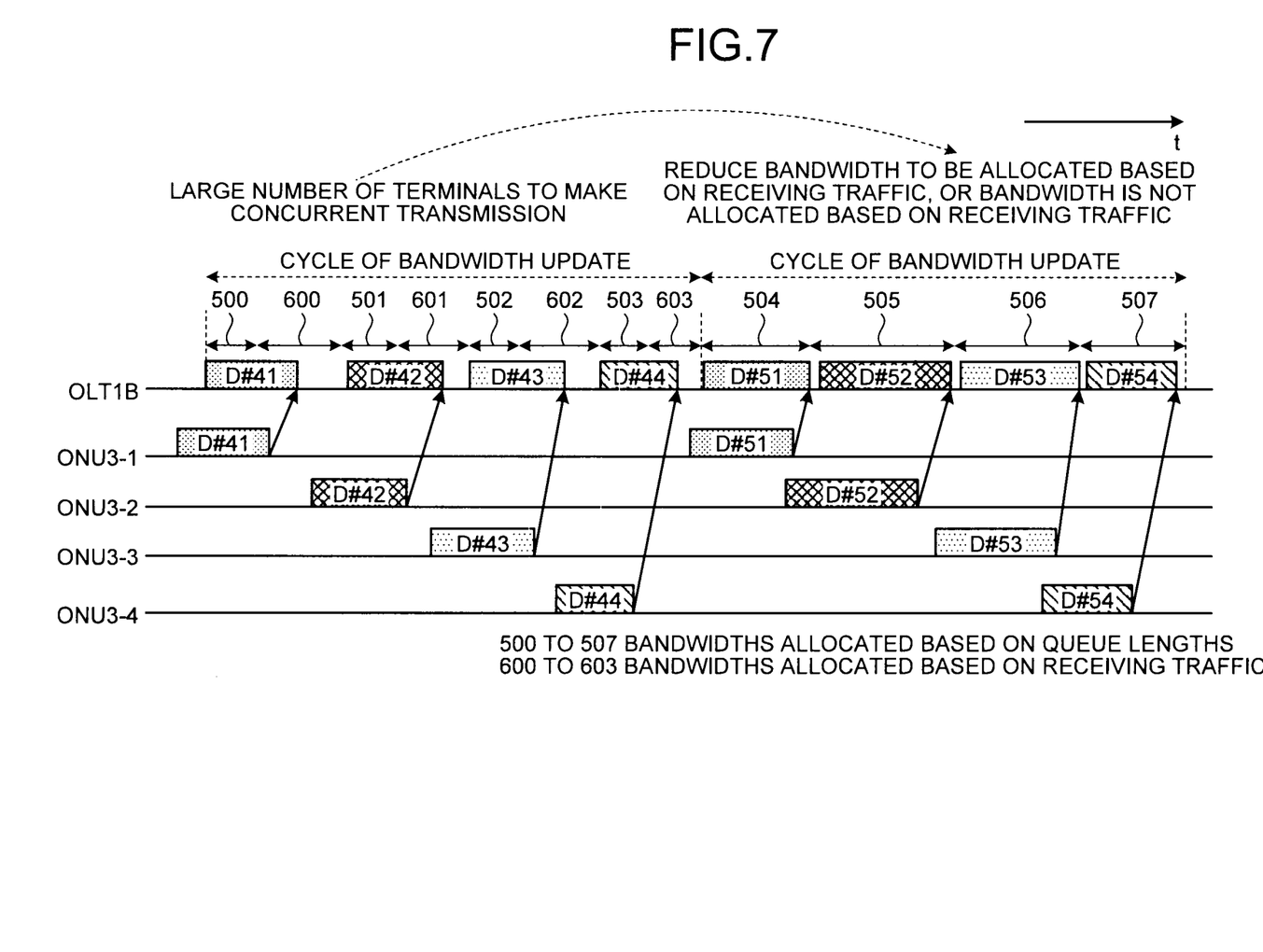
FIG. 7 is a timing chart showing bandwidths allocated before and after update of bandwidth allocation when the number of terminals to make concurrent transmission is large.

FIG. 7 is a timing chart showing bandwidths allocated before and after the update of bandwidth allocation when the number of terminals to make concurrent transmission is large. The ONUs 3-1, 3-2, 3-3, and 3-4 (ONU 3-4 is not shown in FIG. 5) in the PON system shown in FIG. 5 transmit data #41 (hereafter called D#41), D#42, D#43 and D#44 respectively to the OLT 1B before the update of bandwidth allocation. At this time, bandwidths 500 and 600 are allocated to the ONU 3-1. Likewise, bandwidths 501 and 601 are allocated to the ONU 3-2, bandwidths 502 and 602 are allocated to the ONU 3-3, and bandwidths 503 and 603 are allocated to the ONU 3-4. The bandwidths allocated to the ONUs include the bandwidths 500 to 503 based on queue lengths, and the bandwidths 600 to 603 based on receiving traffic.

For bandwidth update, the OLT 1B determines bandwidths to be allocated in a new cycle of bandwidth update in the way described above. Here, it is shown a case where the OLT 1B determines that the number of terminals to make concurrent transmission is equal to or larger than the predetermined threshold. In this case, the OLT 1B allocates a bandwidth based only on a queue length, and does not allocate a bandwidth based on the amount of traffic. As a result, after the update of bandwidth allocation, the ONUs 3-1, 3-2, 3-3 and 3-4 transmit data D#51, D#52, D#53 and D#54 using bandwidths 504, 505, 506 and 507, respectively. The allocated bandwidths 504 to 507 are bandwidths based on queue lengths.

Figure 8:
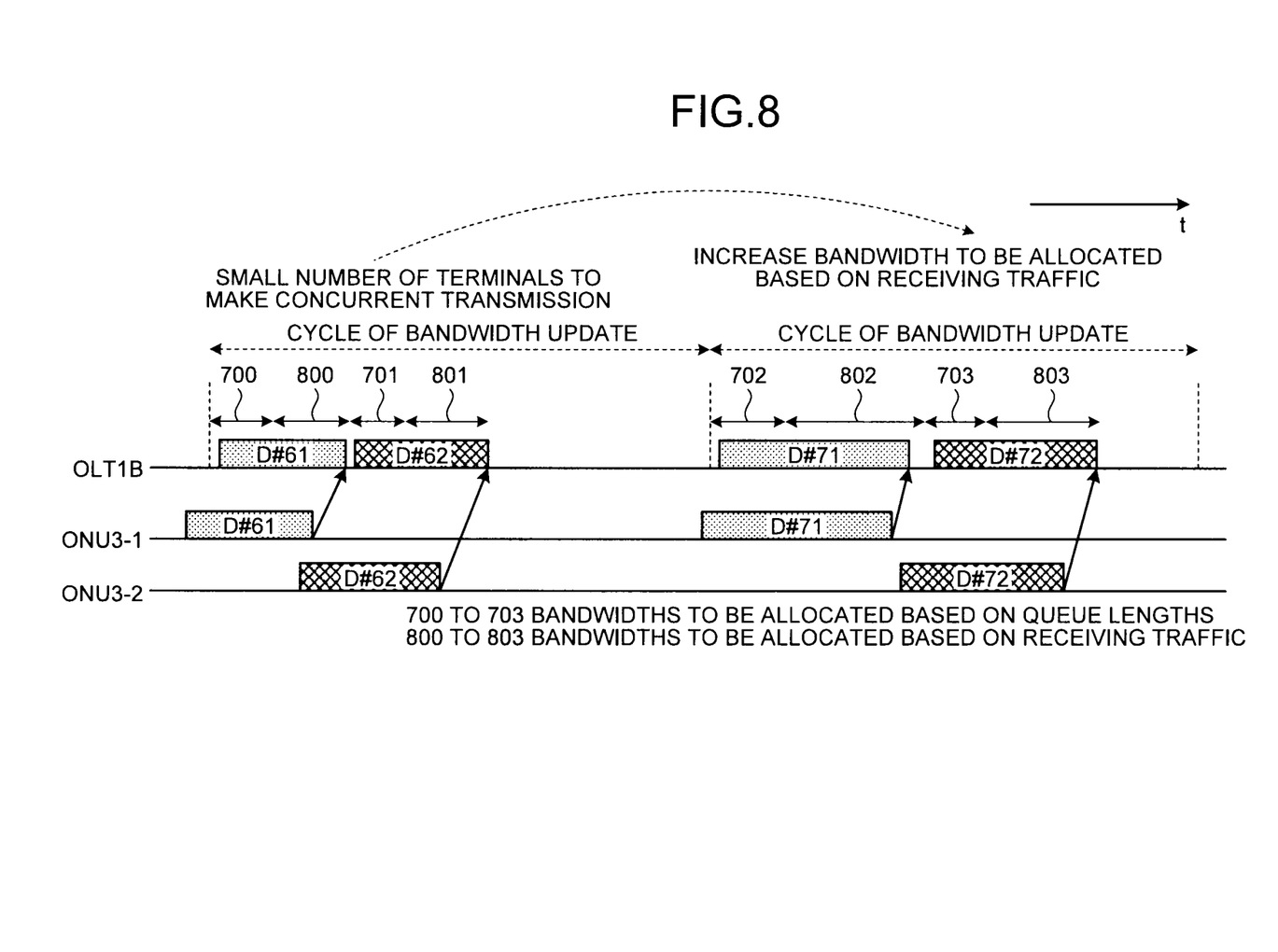
FIG. 8 is a timing chart showing bandwidths allocated before and after update of bandwidth allocation when the number of terminals to make concurrent transmission is small.

FIG. 8 is a timing chart showing bandwidths allocated before and after update of bandwidth allocation when the number of terminals to make concurrent transmission is small. The ONUs 3-1 and 3-2 in the PON system shown in FIG. 5 transmit data #61 (hereafter called D#61) or D#62 respectively to the OLT 1B before the update of bandwidth allocation. At this time, bandwidths 700 and 800 are allocated to the ONU 3-1. Likewise, bandwidths 701 and 801 are allocated to the ONU 3-2. The bandwidths allocated to the respective ONUs include the bandwidths 700 and 701 based on queue lengths, and the bandwidths 800 and 801 based on receiving traffic.

Here, it is shown a case where the OLT 1B determines that the number of terminals to make concurrent transmission is smaller than the predetermined threshold. In this case, in addition to a bandwidth based on a queue length as described above the OLT 1B additionally allocates a bandwidth based on the amount of traffic. As a result, after the update of bandwidth allocation, the ONU 3-1 transmits data D#71 using bandwidths 702 and 802. Likewise, the ONU 3-2 transmits data D#72 using bandwidths 703 and 803. The allocated bandwidths 702 and 703 are bandwidths based on queue lengths, and the allocated bandwidths 802 and 803 are bandwidths based on the amounts of traffic.

In the description given above, it is explained that the amount of traffic is multiplied by a value (coefficient) proportionate to the number of terminals to make concurrent transmission. However, a queue length may also be multiplied by the same coefficient. In this case, a bandwidth to be allocated may be derived by the same method as described above. These methods may be employed in combination.

In the present embodiment, it is shown a case in which the aforementioned coefficient is determined on the basis of the number of terminals to make concurrent transmission. However, the number of active terminals may be employed as the coefficient. However, the bandwidth allocation functioning unit 13B stores the number of active terminals that is the number of ONUs registered with the OLT 1B, and determines the coefficient on the basis of the number of active terminals stored. The operation of the bandwidth allocation functioning unit 13B is the same as that described above.

As described above, in the present embodiment, not only the amount of data scheduled for transmission that is based on a queue length report, but the amount of data expected to be transmitted that is based on the amount of traffic is also evaluated to determine a bandwidth to be allocated. Thus, data accumulated in an ONU buffer during an RTT can also be transmitted when a bandwidth is granted. This realizes reduction of data accumulated in the ONU buffer, leading to a reduction in waiting time for uplink transmission by the ONU. The number of terminals to make concurrent transmission is evaluated for each cycle of bandwidth update, a bandwidth to be allocated can be changed in accordance with the utilization state of a bandwidth in a PON section. As a result, an end user can be given high throughput at an application level.

INDUSTRIAL APPLICABILITY

As described above, the method of allocating a bandwidth according to the present invention is useful in a point-to-multipoint communication system such as a PON system, and in particular, it is employed suitably to realize efficient bandwidth allocation.

The invention claimed is:

1. A communication device operating as a master unit in a point-to-multipoint communication system in which the master unit and slave units transmit and receive variable length data to and from each other, the communication device comprising:
   Media Access Control ("MAC") layer termination functioning unit configured to control an extraction, from an incoming signal, of queue length information scheduled to be transmitted from the slave units, and a transmission of a grant to the slave units;
   traffic monitoring unit configured to measure an uplink traffic amount of each of the slave units; and
   bandwidth allocation functioning unit configured to determine a bandwidth to be allocated to the slave units based on the queue length information extracted by the MAC layer termination functioning unit, the traffic amount measured by the traffic monitoring unit, and a bandwidth that can be allocated in one cycle of bandwidth update, and issue a grant in accordance with the determination, wherein
   the bandwidth allocation functioning unit periodically updates a bandwidth to be allocated,
   calculates a necessary bandwidth for the slave units on the basis of the queue length information and the traffic amount, and calculates a surplus bandwidth by subtracting the necessary bandwidth from the bandwidth that can be allocated in one cycle of bandwidth update,
   determines a coefficient by which the surplus bandwidth is reflected in bandwidth allocation on the basis of the queue length information and the amount of traffic, and
   determines a bandwidth to be allocated to the slave units on the basis of the queue length information, the traffic amount and the coefficient, wherein
   the bandwidth allocation functioning unit;
   acquires the number of active terminals corresponding to the number of active slave units,
   determines a coefficient by which the acquired number of active terminals is reflected in bandwidth allocation based on the number of active terminals, and
   determines a bandwidth to be allocated to the slave units on the basis of the queue length information, the traffic amount and the coefficient.

2. The communication device according to claim 1, wherein the bandwidth allocation functioning unit
   acquires a number of terminals to make concurrent transmission that indicates the number of slave units scheduled to transmit uplink transmission data in a next cycle of bandwidth update,
   determines a coefficient by which the number of terminals to make concurrent transmission is reflected in bandwidth allocation on the basis of the number of terminals to make concurrent transmission,
   determines a bandwidth to be allocated to the slave units on the basis of the queue length information, the traffic amount and the coefficient,
   updates the coefficient for each cycle of bandwidth update, and
   determines a bandwidth to be allocated to the slave unit using the updated coefficient.

3. The communication device according to claim 1, wherein the bandwidth allocation functioning unit updates the coefficient for each cycle of bandwidth update, and determines a bandwidth to be allocated to the slave unit using the updated coefficient.

4. A communication device operating as a master unit in a point-to-multipoint communication system in which the master unit and slave units transmit and receive variable length data to and from each other, the communication device comprising:

Media Access Control ("MAC") layer termination functioning unit configured to control an extraction, from an incoming signal, of queue length information scheduled to be transmitted from the slave units, and a transmission of a grant to the slave units;

traffic monitoring unit configured to measure an uplink traffic amount of each of the slave units; and bandwidth allocation functioning unit configured to determine a bandwidth to be allocated to the slave units based on the queue length information extracted by the MAC layer termination functioning unit, the traffic amount measured by the traffic monitoring unit, and a bandwidth that can be allocated in one cycle of bandwidth update, and issue a grant in accordance with the determination, wherein the bandwidth allocation functioning unit periodically updates a bandwidth to be allocated, calculates a necessary bandwidth for the slave units on the basis of the queue length information and the traffic amount, and calculates a surplus bandwidth by subtracting the necessary bandwidth from the bandwidth that can be allocated in one cycle of bandwidth update, determines a coefficient by which the surplus bandwidth is reflected in bandwidth allocation on the basis of the queue length information and the amount of traffic, and determines a bandwidth to be allocated to the slave units on the basis of the queue length information, the traffic amount and the coefficient, wherein the bandwidth allocation functioning unit updates the coefficient for each cycle of bandwidth update, and determines a bandwidth to be allocated to the slave unit using the updated coefficient.

5. A method of allocating a bandwidth in a point-to-multipoint communication system in which slave units and a master unit transmit and receive variable length data to and from each other, the method being conducted by a communication device operating as the master unit, the method comprising the steps of:

acquiring queue length information for extracting, from a receiving signal, queue length information scheduled to be transmitted from the slave units;

measuring a traffic amount of uplink traffic of each of the slave units; and allocating a bandwidth for determining a bandwidth to be allocated to the slave unit on the basis of the queue length information extracted in the queue length information acquiring step, the traffic amount measured in the traffic amount measuring step, and a bandwidth that can be allocated in one cycle of bandwidth update, and issuing a grant according to the determination, wherein the bandwidth allocating step is periodically performed, and includes:

a surplus bandwidth calculating step of calculating a necessary bandwidth of the slave unit on the basis of the queue length information and the traffic amount, and calculating a surplus bandwidth by subtracting the necessary bandwidth from the bandwidth that can be allocated in one cycle of bandwidth update;

a coefficient determining step of determining a coefficient by which the surplus bandwidth is reflected in bandwidth allocation on the basis of the queue length information and the traffic amount; and a bandwidth determining step of determining a bandwidth to be allocated to the slave unit on the basis of the queue length information, the traffic amount and the coefficient, wherein the bandwidth allocating step includes:

an active terminal number acquiring step of acquiring the number of active terminals corresponding to the number of active slave units;

a coefficient determining step of determining a coefficient by which the number of active terminals is reflected in bandwidth allocation on the basis of the number of active terminals; and a bandwidth determining step of determining a bandwidth to be allocated to the slave unit on the basis of the queue length information, the traffic amount and the coefficient.

6. The method of bandwidth allocation according to claim 5, wherein the coefficient determining step is performed for each cycle of bandwidth update, and the bandwidth determining step is performed using the coefficient determined in the coefficient determining step.

7. A method of allocating a bandwidth in a point-to-multipoint communication system in which slave units and a master unit transmit and receive variable length data to and from each other, the method being conducted by a communication device operating as the master unit, the method comprising the steps of:

acquiring queue length information for extracting, from a receiving signal, queue length information scheduled to be transmitted from the slave units;

measuring a traffic amount of uplink traffic of each of the slave units; and allocating a bandwidth for determining a bandwidth to be allocated to the slave unit on the basis of the queue length information extracted in the queue length information acquiring step, the traffic amount measured in the traffic amount measuring step, and a bandwidth that can be allocated in one cycle of bandwidth update, and issuing a grant according to the determination, wherein the bandwidth allocating step is periodically performed, and includes:

a surplus bandwidth calculating step of calculating a necessary bandwidth of the slave unit on the basis of the queue length information and the traffic amount, and calculating a surplus bandwidth by subtracting the necessary bandwidth from the bandwidth that can be allocated in one cycle of bandwidth update;

a coefficient determining step of determining a coefficient by which the surplus bandwidth is reflected in bandwidth allocation on the basis of the queue length information and the traffic amount; and a bandwidth determining step of determining a bandwidth to be allocated to the slave unit on the basis of the queue length information, the traffic amount and the coefficient, wherein the coefficient determining step is performed for each cycle of bandwidth update, and the bandwidth determining step is performed using the coefficient determined in the coefficient determining step.

8. A method of allocating a bandwidth in a point-to-multipoint communication system in which slave units and a master unit transmit and receive variable length data to and from each other, the method being conducted by a communication device operating as the master unit, the method comprising the steps of:

acquiring queue length information for extracting, from a receiving signal, queue length information scheduled to be transmitted from the slave units;

measuring a traffic amount of uplink traffic of each of the slave units; and allocating a bandwidth for determining a bandwidth to be allocated to the slave unit on the basis of the queue length information extracted in the queue length information acquiring step, the traffic amount measured in the traffic amount measuring step, and a bandwidth that can be allocated in one cycle of bandwidth update, and issuing a grant according to the determination, wherein the bandwidth allocating step is periodically performed, and includes:

a surplus bandwidth calculating step of calculating a necessary bandwidth of the slave unit on the basis of the queue length information and the traffic amount, and calculating a surplus bandwidth by subtracting the necessary bandwidth from the bandwidth that can be allocated in one cycle of bandwidth update;

a coefficient determining step of determining a coefficient by which the surplus bandwidth is reflected in bandwidth allocation on the basis of the queue length information and the traffic amount; and a bandwidth determining step of determining a bandwidth to be allocated to the slave unit on the basis of the queue length information, the traffic amount and the coefficient, wherein the bandwidth allocating step includes:

a transmission terminal number acquiring step of acquiring the number of terminals to make concurrent transmission that indicates the number of slave units scheduled to transmit uplink transmission data in a next cycle of bandwidth update;

a coefficient determining step of determining a coefficient by which the number of terminals to make concurrent transmission is reflected in bandwidth allocation on the basis of the number of terminals to make concurrent transmission; and a bandwidth determining step of determining a bandwidth to be allocated to the slave unit on the basis of the queue length information, the traffic amount and the coefficient, wherein the coefficient determining step is performed for each cycle of bandwidth update, and the bandwidth determining step is performed using the coefficient determined in the coefficient determining step.

* * * * *